(12) United States Patent
Matsuo et al.

(10) Patent No.: US 8,925,840 B2
(45) Date of Patent: Jan. 6, 2015

(54) PROCESS FOR PRODUCING CALCIUM PHOSPHATE-BASED PARTICLES

(75) Inventors: Takashi Matsuo, Kurashiki (JP); Takashi Makabe, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 386 days.

(21) Appl. No.: 13/382,719

(22) PCT Filed: Jul. 2, 2010

(86) PCT No.: PCT/JP2010/061320
§ 371 (c)(1),
(2), (4) Date: Jan. 6, 2012

(87) PCT Pub. No.: WO2011/004766
PCT Pub. Date: Jan. 13, 2011

(65) Prior Publication Data
US 2012/0111980 A1    May 10, 2012

(30) Foreign Application Priority Data
Jul. 7, 2009    (JP) ................... 2009-160386

(51) Int. Cl.
B02C 25/00    (2006.01)
C04B 38/00    (2006.01)
B02C 1/12    (2006.01)
C04B 35/447    (2006.01)
C04B 35/626    (2006.01)
C04B 35/64    (2006.01)

(52) U.S. Cl.
CPC .............. C04B 38/0003 (2013.01); B02C 1/12 (2013.01); C04B 35/447 (2013.01); C04B 35/62655 (2013.01); C04B 35/64 (2013.01); C04B 2235/3206 (2013.01); C04B 2235/6023 (2013.01); C04B 2235/6567 (2013.01)
USPC .......................................... 241/30

(58) Field of Classification Search
USPC .............................................. 241/30, 270, 95
See application file for complete search history.

(56) References Cited

U.S. PATENT DOCUMENTS 28,966 A * 7/1860 Chapman ................. 241/199.11
65,504 A * 6/1867 Pryor ............................ 241/166
(Continued)

FOREIGN PATENT DOCUMENTS

CN    101310849 A    11/2008
JP    50-131669 U    10/1975
(Continued)

OTHER PUBLICATIONS

Second Office Action issued Nov. 18, 2013 in Chinese Patent Application No. 201080030291.9 (with English Summary of Second Office Action).

(Continued)

Primary Examiner — Faye Francis
(74) Attorney, Agent, or Firm — Oblon, Spivak, McClelland, Maier & Neustadt, L.L.P.

(57) ABSTRACT

A method for making calcium phosphate particles, the method including compressively pulverizing a molded body containing, as a principal component, a calcium phosphate material with a plurality of parallel extending needlelike projections. The molded body contains a plurality of void holes oriented in one direction and the pulverizing is carried out by moving the needlelike projections in a direction of protrusion, which is aligned with the one direction. Each needlelike projection has a diameter within a range of 1.0 to 2.0 mm and a number the needlelike projections per unitary surface area is within a range of 5 to 35 per cm$^2$.

12 Claims, 5 Drawing Sheets

(56) References Cited

U.S. PATENT DOCUMENTS

| | | | | |
|---|---|---|---|---|
| 718,977 | A | * | 1/1903 | Budesheim ..................... 99/583 |
| 1,133,863 | A | * | 3/1915 | Krocker .......................... 241/94 |
| 1,728,075 | A | * | 9/1929 | Norton ........................... 241/165 |
| 2,046,396 | A | * | 7/1936 | Matter et al. .................. 241/84.4 |
| 2,056,097 | A | * | 9/1936 | Fegley et al. ................ 241/199.9 |
| 2,061,265 | A | * | 11/1936 | Yeomans ................. 241/199.11 |
| 2,084,622 | A | | 6/1937 | Norton |
| 2,095,601 | A | * | 10/1937 | Hope .............................. 241/76 |
| 2,572,378 | A | * | 10/1951 | Milton ............................ 99/581 |
| 3,113,838 | A | * | 12/1963 | Giovanni Perri et al. .. 423/157.3 |
| 4,694,996 | A | * | 9/1987 | Siegel ............................ 241/100 |
| 8,147,118 | B2 | | 4/2012 | Schmied et al. |
| 2005/0147551 | A1 | * | 7/2005 | Tofighi et al. .................. 423/305 |
| 2009/0112367 | A1 | | 4/2009 | DeCourcy et al. |
| 2010/0157721 | A1 | | 6/2010 | Schmied et al. |

FOREIGN PATENT DOCUMENTS

| | | |
|---|---|---|
| JP | 51-68066 U | 5/1976 |
| JP | 54 19255 | 2/1979 |
| JP | 63 178856 | 7/1988 |
| JP | 2000 281405 | 10/2000 |
| JP | 2003 201161 | 7/2003 |
| JP | 2006 198355 | 8/2006 |
| WO | WO 2008/012139 A1 | 1/2008 |

OTHER PUBLICATIONS

Korean Office Action issued Mar. 28, 2013, in Korea Patent Application No. 10-2012-7003206 (with partial English translation).

Office Action issued Jan. 14, 2014 in Japanese Patent Application No. 2011-521900 (with English summary).

Combined Chinese Office Action and Search Report issued Jul. 3, 2013 in Patent Application No. 201080030291.9 with Partial English Translation.

International Search Report Issued Aug. 24, 2010 in PCT/JP10/61320 Filed Jul. 2, 2010.

* cited by examiner

PROCESS FOR PRODUCING CALCIUM PHOSPHATE-BASED PARTICLES

CROSS REFERENCE TO THE RELATED APPLICATION

This application is based on and claims Convention priority to Japanese patent application No. 2009-160386, filed Jul. 7, 2009, the entire disclosure of which is herein incorporated by reference as a part of this application.

BACKGROUND OF THE INVENTION

1. Field of the Invention

The present invention relates to a process of producing calcium phosphate-based particles and an apparatus for use in executing such method.

2. Description of Related Art

In making calcium phosphate-based particles, a method is generally known, in which a raw material containing calcium phosphate-based material as a principal component is added with a binder, a foaming agent, flammable beads and others and is subsequently formed into a slurry with water, an organic solvent and others dispersed therein, the slurry being then injected into a mold assembly for molding, or is formed into a highly viscous composition containing such components as described above, which composition is subsequently extruded for molding, to thereby prepare a molded body having a predetermined shape, the molded body being thereafter calcined as necessary and then pulverized by the use of a pulverizing machine such as, for example, a jaw crusher or a mortar into particles that are in turn screened to have a predetermined particle size. In this respect, see the patent document 1 listed below.

RELATED ART LITERATURE

[Patent Document 1] JP Laid-open Patent Publication No. 2000-281405

The known method utilizing the pulverizing machine such as the jaw crusher as discussed above has, however, been found having such a problem that particularly where the calcium phosphate-based particles desired to be produced have a particle size of about a few millimeters, the particles of a particle size exceeding the maximum allowable gauge may be re-pulverized, but the particles of a particle size smaller than the minimum allowable gauge can no longer be used, accompanied by a reduction in yield.

SUMMARY OF THE INVENTION

The present invention has been devised with due consideration paid to the above discussed problem inherent in the related art method of making the calcium phosphate-based particles and is intended to provide a method of and an apparatus for making the calcium phosphate-based particles, in which the yield of production of the calcium phosphate-based particles can be increased.

The inventors of the present invention have found that as a result of conducted extensive studies, when a molded body, containing a calcium phosphate-based material as a principal component, is compressively pulverized by a plurality of needlelike projections protruding parallel to each other, a marked improvement in yield of manufacture of calcium phosphate-based particles could be achieved, and have now come to provide the present invention based on this finding.

Specifically, a method of making calcium phosphate-based particles in accordance with the present invention is characterized in that the molded body containing the calcium phosphate-based material as a principal component is compressively pulverized by the plurality of needlelike projections protruding parallel to each other.

According to the above described construction, as compared with the conventional pulverization accomplished with the use of the roll mill, a pulverized matter (calcium phosphate-based particles) having a particle size within a specific size range can be obtained at a high yield. For example, desired particles can be obtained when the size and/or the arrangement of the needlelike projections are changed.

The molded block preferably has a plurality of void holes defined therein and oriented in one direction so that it can be compressively pulverized by moving the needlelike projections in a direction, in which those needlelike projections protrude, while such one direction is aligned with the direction of protrusion of the needlelike projections. Although the molded body having the void hole defined therein and oriented in one direction, when pulverized, will hardly result in the particles of a desired particle size, according to this method, the particles of a desired particle size can be easily obtained when the size and/or the arrangement of the needlelike projections are changed.

In a preferred embodiment of the present invention, each of the needlelike projections has a diameter within the range of 1.0 to 2.0 mm. The diameter of each of the needlelike projections means a diameter of a shank portion of each needlelike projection, which pass through the molded body. Also, the number of the needlelike projection employed per unitary surface area is preferably within the range of 5 to 35 per $cm^2$. Similarly, the grid angle of the needlelike projections is preferably within the range of 60 to 120°. According to those features, the particles of a desired particle size and shape can be obtained.

In another preferred embodiment of the present invention, by compressively pulverizing the molded body of the calcium phosphate-based material having a thickness, as measured in a direction parallel to such one direction, which is within the range of 1.5 to 3.0 mm, the calcium phosphate-based material having a particle size within the range of 1.0 to 5.0 mm can be obtained.

The present invention in accordance with another aspect thereof provides a compressive pulverizing machine for compressively pulverizing a molded body containing a calcium phosphate-based material as a principal component, which machine includes a lower press die on which the molded body is placed; a clogging preventive plate arranged above the lower press die; an upper press die arranged above the clogging preventive plate and provided with a plurality of downwardly oriented needlelike projections juxtaposed in a horizontal direction; and a drive unit for driving one of the upper press die and the lower press die toward the other to allow the needlelike projections to pass through the clogging preventive plate, the molded body and the lower press die.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
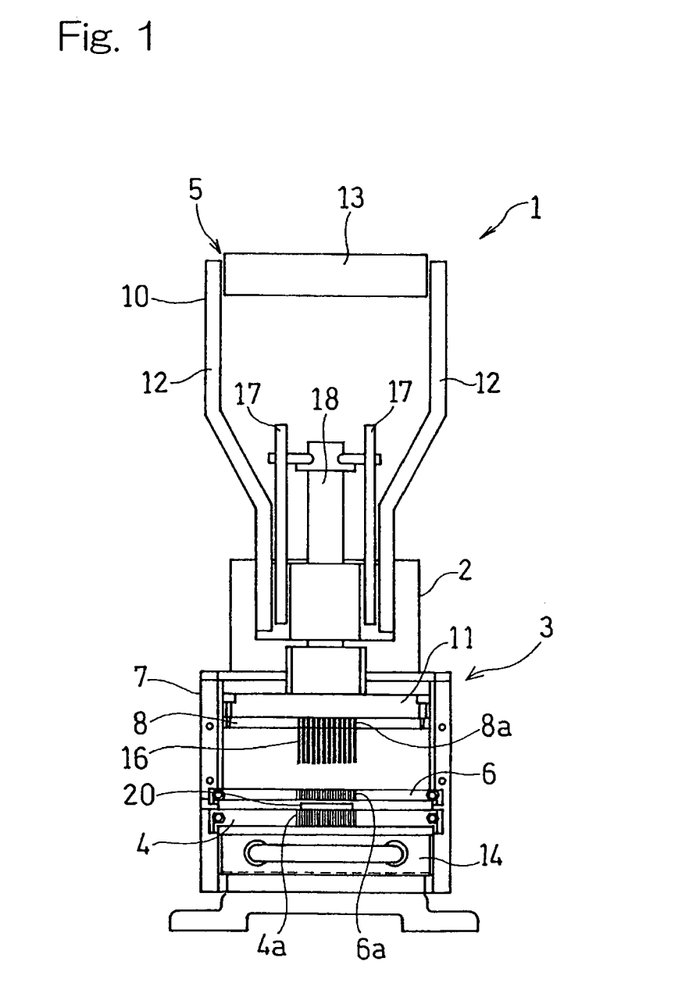
FIG. 1 is a front elevational view of a compressive pulverizing machine according to a first preferred embodiment of the present invention.
Figure 2:
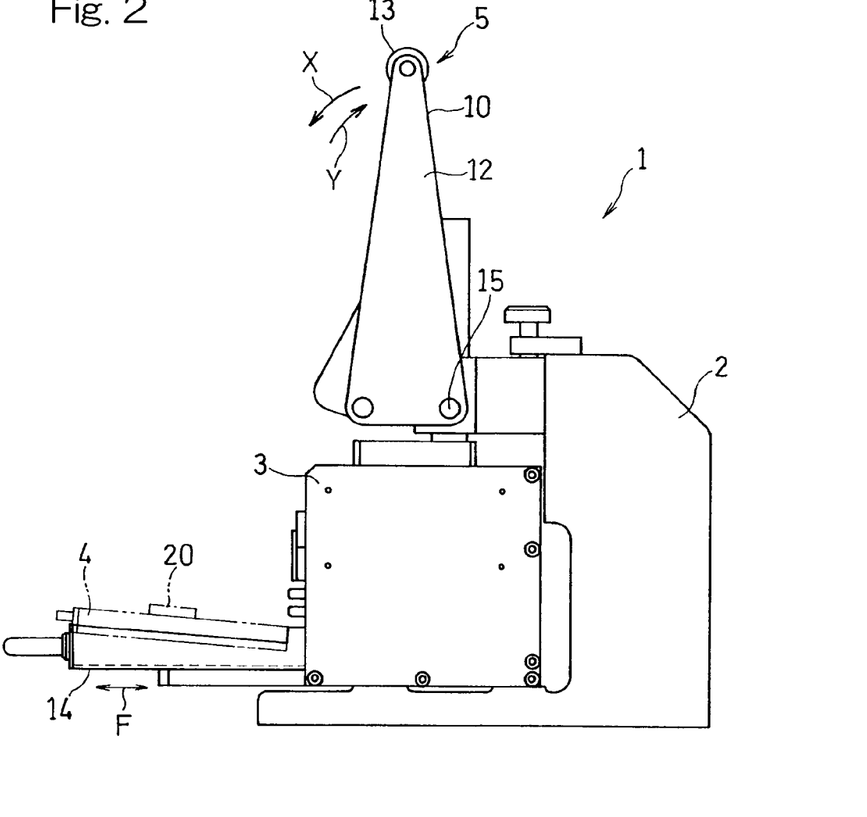
FIG. 2 is a side view of the compressive pulverizing machine shown in FIG. 1.

Hereinafter, a preferred embodiment of the present invention will be described in detail with reference to the accompanying drawings. A compressive pulverizing machine, generally identified by 1, is of a type including, as shown in FIGS. 1 and 2, a machine bench 2 on which a pulverizing mold 3 and a drive unit 5 are mounted. As shown in FIG. 1, the pulverizing mold 3 is made up of a lower press die 4 for supporting thereon a molded body 20 as will be described later, a clogging preventive plate 6 disposed above the lower press die 4 and an upper press die 8 disposed above the clogging preventive plate 6, all accommodated inside a frame structure 7. The drive unit 5 has a lever assembly 10 positioned above the upper press die 8 and connected pivotally with the machine bench 2, and the upper press die 8 can be moved up and down by the pivotal movement of the lever assembly 10. A tray 14 is positioned beneath the lower press die 4 and connected with the frame structure 7 for movement in a direction F forward or rearward of the compressive pulverizing machine 1, i.e., in a direction F substantially perpendicular to the direction of movement of the upper press die 8 as indicated in FIG. 2.

The upper press die 8 shown in FIG. 1 is of a structure having a plurality of mounting holes 8a defined in a horizontal plate member and a plurality of downwardly oriented needlelike projections 16 each being of a shape generally similar to a nail and inserted through the respective mounting hole 8a. In this configuration, the needlelike projections 16 are so arranged as to extend parallel to each other in a vertical direction perpendicular to the plane of the perforated horizontal plate member. The upper press die 8 having the needlelike projections 16 in the manner described above is secured to an undersurface of a retaining member 11. The lower press die 4 and the clogging preventing plate 6 have respective throughholes 4a and 6a defined therein so that the needlelike projections 16 pass through those throughholes 4a and 6a. In any event, the lower press die 4, the clogging preventive plate 6 and the upper press die 8 are all removably mounted on the frame structure 7.

The lever assembly 10 of the drive unit 5 is made up of left and right lever plates 12 having respective first ends connected together through a grip 13 at a location remote from the machine bench 2. Those left and right lever plates 12 have respective second ends opposite to the first ends, which are supported by the machine bench 2, shown in FIG. 2, by a pivot shaft 15 for reciprocal pivotal movement about the pivot shaft 15 in a direction shown by the arrows X and Y. The lever plates 12 have respective arms 17 fitted thereto for movement in association therewith such that when the lever assembly 12 is pivoted downwardly in the direction X shown in FIG. 2 about the pivot shaft 15, a piston 18 can descend through the arms 17. The piston 18 has a lower end having the retaining member 11 secured rigidly thereto, and the upper press die 8 referred to above is removably connected with the retaining member 11 by means of suitable fitting members (not shown) such as, for example, bolts.

Figure 3:
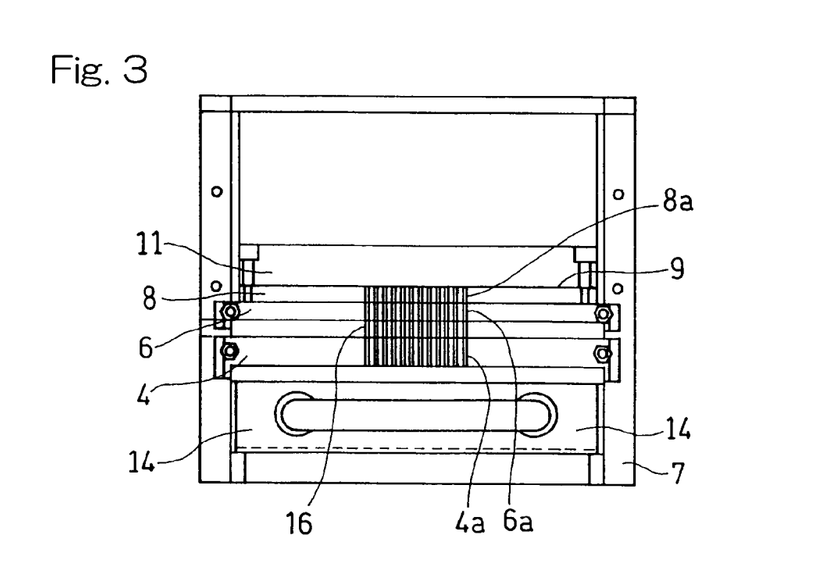
FIG. 3 is a front elevational view showing a portion of the compressive pulverizing machine of FIG. 1 on an enlarged scale.
Figure 4A:
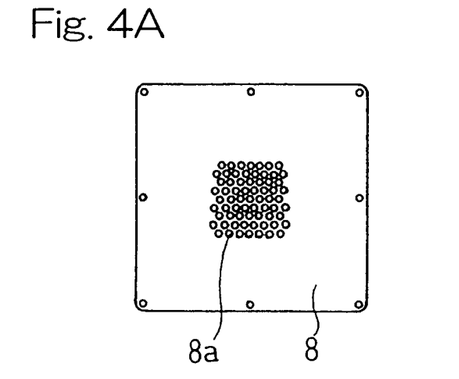
FIG. 4A is a bottom view showing an upper press die, employed in the compressive pulverizing machine of FIG. 1, as viewed from bottom of the latter.
Figure 4B:
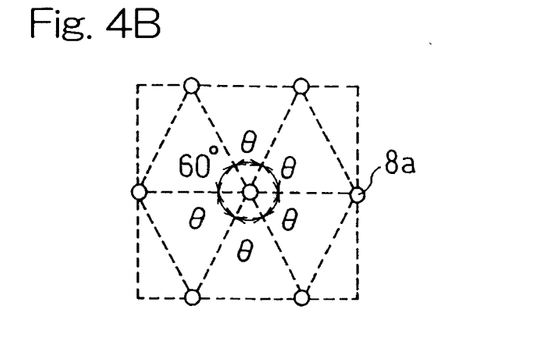
FIG. 4B is a view showing the upper press die of FIG. 4A on an enlarged scale.
Figure 4C:
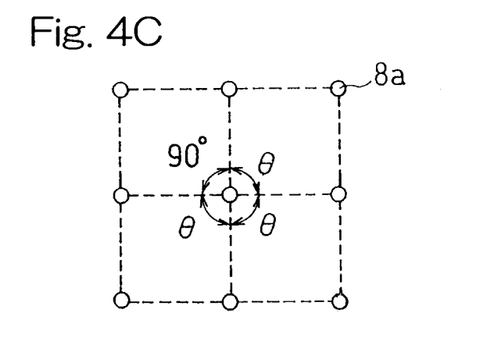
FIG. 4C is a view showing a modified arrangement of needlelike projections.
Figure 4D:
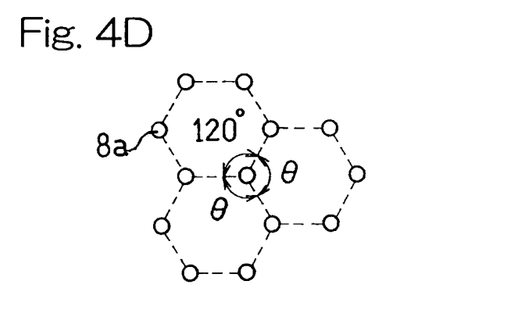
FIG. 4D is an enlarged view showing a further modified arrangement of the needlelike projections.

Referring to FIG. 3, the upper press die 8 and the lower press die 4 are so designed and so configured relative to each other that when the upper press die 8 moves downwardly, the needlelike projections 16 fitted to the upper press die 8 can pass through the throughholes 6a in the clogging preventive plate 6 and then through the throughholes 4a in the lower press die 4, respectively. As shown in FIG. 4A, the upper press die 8, when viewed from bottom, represents a substantially square shape and the plurality of mounting holes 8a referred to previously, 67 holes in number in the instance as shown, are defined in a central portion of the upper press die 8. Also, as shown in FIG. 4B, those mounting holes 8a are arranged generally in a grid pattern with the adjacent three holes 8a forming an equilateral triangle. In this grid pattern of the mounting holes 8a, the grid angle θ is chosen to be 60°. The term "grid angle" referred to above and hereinafter means the angle defined between the closest neighboring members of the holes 8a. It is, however, to be noted that the grid angle θ may be chosen to be 90° as shown in FIG. 4C or 120° as shown in FIG. 4D.

In any event, in the practice of the present invention, the grid angle θ is chosen to be generally within the range of 60 to 120°, preferably within the range of 60 to 90°, and more preferably at angles of 60° and 90° With respect to the needlelike projections 16, since they are passed through the mounting holes 8a in the manner as hereinabove described and as shown in FIG. 4A, those needlelike projections 16 are so arranged as to conform to the pattern of arrangement of the mounting holes 8a described hereinabove.

Figure 5:
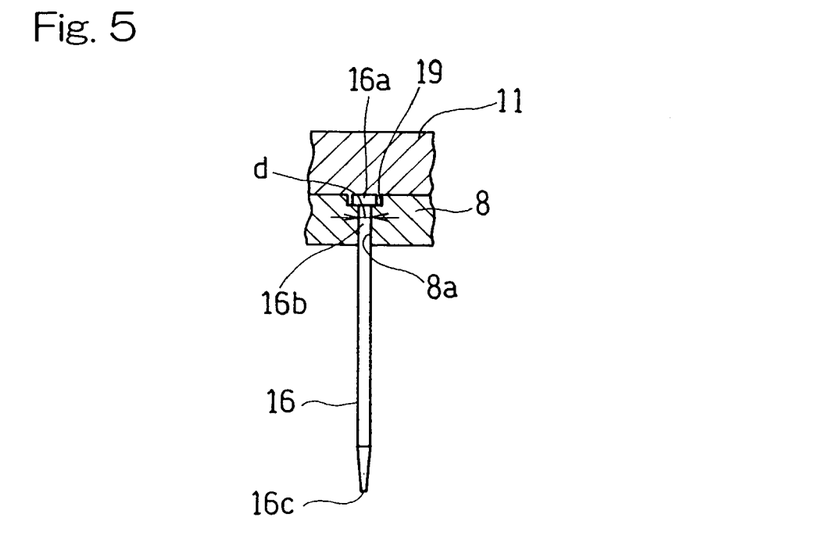
FIG. 5 is a side view of one of the needlelike projections employed in the compressive pulverizing machine of FIG. 1.

The details of the needlelike projections 16 will now be described with particular reference to FIG. 5, bearing in mind that since those needlelike projections 16 are of identical structure, reference will be made only to one of them unless otherwise specified. As shown therein, the needlelike projection 16 is made up of a radially outwardly bulged head 16a and a shank portion 16b extending from the head 16a. When the needlelike projection 16 is to be carried by the upper press die 8, the needlelike projection 16 is inserted through the corresponding mounting hole 8a with the head 16a nested within a recess 19 defined in an upper surface of the upper press die 8 and, also, with the needlelike shank portion 16b extending out of the corresponding mounting hole 8a. In this condition, when the retaining member 11 is positioned on the upper surface of the upper press die 8, the undersurface of the retaining member 11 contacts an upper face of the head 16a to thereby retain the needlelike projection 16 immovable in a direction axially thereof relative to the upper press die 8.

The shank portion 16b of each of the needlelike projections 16, which is passed through the corresponding mounting hole 8a in the upper press die 8, is of a straight cylindrical configuration and has a free end portion 16c pointed or tapered outwardly. The shank portion 16b of the respective needlelike projection 16 has a diameter d which is preferably so chosen as to fall within the range of 1.0 to 2.0 mm. Accordingly, a portion of the needlelike projection 16 protruding downwardly from the upper press die 8, that is, a portion of the needle like projection 16, which projects through the molded body 20, has a diameter within the range of 1.0 to 2.0 mm. If the diameter is less than 1.0 mm, the particles will be little pulverized, but if it exceeds 2.0 mm, there is the possibility that the particles will have a varying particle size. Also, the number of the needlelike projections 16 per unitary surface area of the upper press die 8 is preferably within the range of 5 to 35 cm$^2$.

Figure 6A:
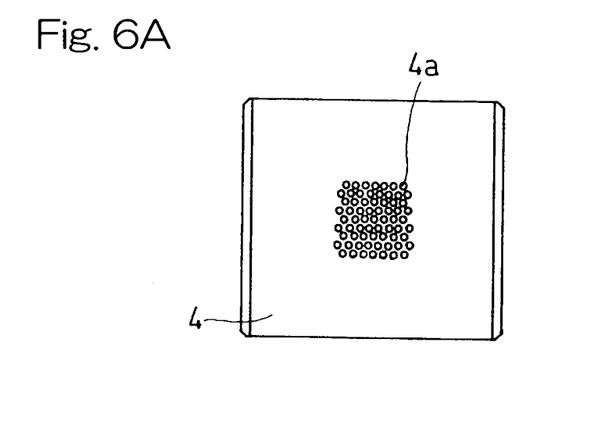
FIG. 6A is a top plain view of a lower press die as viewed from top.
Figure 6B:
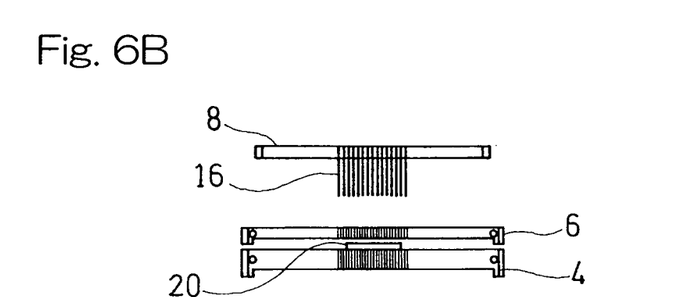
FIG. 6B is a side view showing the lower press die and a clogging preventive plate.

Referring to FIG. 6A, the lower press die 4 is also of a substantially square shape when viewed from top and has its central portion formed with the throughholes 4a which are arranged in a pattern substantially identical with the pattern of arrangement of the mounting holes 8a in the central portion of the upper press die 8. Likewise, the clogging preventive plate 6 has the throughholes 6a which are arranged in a pattern substantially identical with the pattern of arrangement of the mounting holes 8a in the central portion of the upper press die 8.

Figure 7:
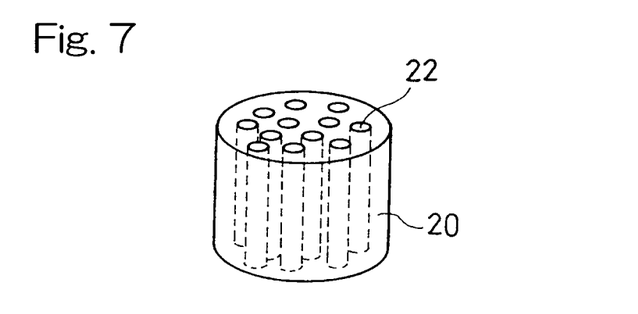
FIG. 7 is a perspective view showing a molded body that is to be pulverized by the compressive pulverizing machine of FIG. 1.

The details of the molded body 20 shown in FIG. 7 will be hereinafter described. The molded body 20 is a porous sintered mold of a cylindrical shape containing a calcium phosphate-based material as a principal component. The calcium phosphate material referred to above is a material of a kind embedded in, for example, bone crevices during the medical treatment of bone tumors or bone fracture. As shown in FIG. 7, the molded body 20 has a plurality of elongated pores 22, which are throughholes, defined therein so as to extend in one direction up and down. That the pores 22 extend in one direction as described above means that the pores 22 have their lengthwise directions all lying in the same direction and, more specifically, that major axes of ½ or more of the elongated pores 22 which extends in that one direction within the calcium phosphate-based material lie within a crossing angle of 30°. It is to be noted that the term "crossing angle" referred to above and hereinafter is to be construed as meaning the crossing angle measured in the orthogonal projection of the major axes of the elongated pores 22 on an arbitrarily chosen plane.

The molded body 20 is available in any known method. By way of example, the method of making the molded body 20 includes a slurry preparing step (step A) of dispersing the raw material for the molded body into a medium to form a slurry 26 as shown in FIG. 8A, a filling step (step B) of filling the resultant slurry 26 into a container 28 as shown in FIG. 8B, a freezing step (step C) of freezing the slurry 26 in one direction from one end side after the container 28 accommodating the slurry 26 has been inserted in a predetermined direction, more specifically in a direction shown by the arrow A in FIG. 8C, into a cooling refrigerant 30 of a temperature lower than the freezing point of the slurry 26, a drying step (step D) of drying the frozen slurry 26 to obtain the resultant molded body 20, and a firing step (step E) of firing the dried molded body 20.

Figure 8A:
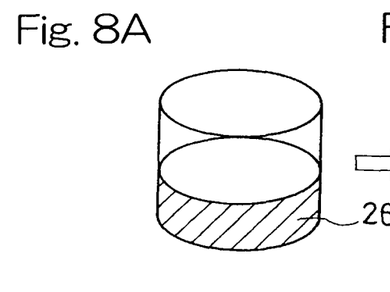
FIGS. 8A to 8D illustrate respective process steps of a method of forming the molded body shown in FIG. 7.
Figure 8B:
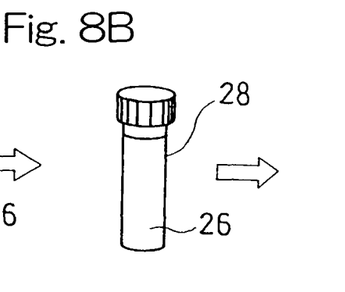

FIG. 8A is a diagram schematically illustrating the preparation of the slurry 26. The slurry 26 used in the practice of the slurry preparing step A can be prepared by dispersing the raw material for the molded body into the medium. The raw material for the molded body means particles used to make the molded body 20 and, more specifically, particles used to make the calcium phosphate-based material. Also, the slurry 26 contains an additive as will be described later, which additive is dissolved or dispersed in the slurry 26.

The raw material for the molded body may be one or an arbitrary combination of, for example, hydroxyapatite, fluoroapatite, chloroapatite, tricalcium phosphate, calcium metaphosphate, tetracalcium phosphate, calcium hydrogen phosphate, calcium hydrogen phosphate dihydrate and so on. Also, in the molded body 20, a portion of a Ca component in the calcium phosphate-based material may be substituted by one or more selected from Sr, Ba, Mg, Fe, Al, Y, La, Na, K, Ag, Pd, Zn, Pb, Cd, H and other rare earths. In addition, a portion of a ($PO_4$) component may be substituted by one or more selected from the group consisting of $VO_4$, $BO_3$, $SO_4$, $CO_3$, $SiO_4$ and others. Yet, a portion of (OH) component may be substituted by one or more selected from the group consisting of F, Cl, O, $CO_3$, I and Br.

Figure 8C:
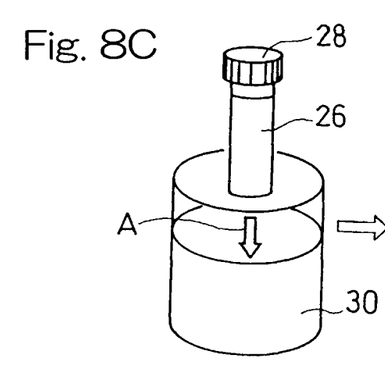

After the slurry 26 prepared during the slurry preparing step A described above has been filled in the container 28 during the filling step B, shown in FIG. 8B, and the container 28 then accommodating therein the slurry 26 has been subsequently inserted (immersed) into the refrigerant 30, then cooled down to a temperature lower than the freezing point of the slurry 26, during the step C as shown in FIG. 8C, the slurry 26 within the container 28 is allowed to freeze in one direction from one end side, that is, the side of a leading end of the container 28 with respect to the direction of insertion of the container 28 into the refrigerant 30 to eventually obtain a molded body of the slurry 26. As a result of this freezing, crystals of the refrigerant frozen, which are similar in shape to frost column-like crystals, grow within the molded body, having been oriented in one direction.

Figure 8D:
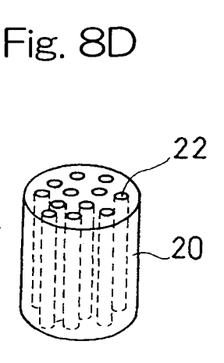

During the drying step D shown in FIG. 8D, the frozen slurry 26 is dried to allow the crystals of the refrigerant to sublimate, thereby completing the molded body 20 having the elongated pores 22 defined therein. Typically, the container 28 accommodating therein the slurry 26 is freeze-dried under the atmosphere of a reduced pressure. By so doing, the medium components of a shape similar to the frost pillars are allowed to sublimate such that portions of the slurry, where the coagulated medium components have occupied, leave the respective elongated pores 22 as traces of sublimation of the medium components referred to above. Therefore, the elongated pores 22 oriented in one direction are formed in the molded body 20.

During the firing step E, the molded body 20 so configured as hereinabove described is fired, thus resulting in the molded body 20 of a type having the elongated pores 22 and in which the calcium phosphate-based particles are finely sintered. Typically, the molded body obtained at the step D is removed from the container 28 and is subsequently molded as required or necessary and finally fired at a temperature appropriate to the molded body 20 for a sintering time appropriate to the molded body 20. At the time of sintering (firing), sintering conditions are so preferably determined that the resultant sintered body may have such a physical strength as to be appropriate for it to be embedded in vivo, that is, a physical strength enough to be processed at the site of surgery and enough to avoid an undesirable fracture when and after it is embedded in vivo. With the sintering conditions so properly selected, the molded body 20 can be formed, having the elongated pores 22 defined by the traces of the medium components, then solidified in a shape similar to the shape of column-like crystals, upon complete sublimation of the medium components.

Hereinafter, a method of making the calcium phosphate-based particles from the molded body 20 with the use of the compressive pulverizing machine 1 of the type described in detail hereinbefore with particular reference to FIG. 1. The particles pulverized by the compressive pulverizing machine 1 are used to fill up bone crevices during the medical treatment of bone tumors or bone fracture.

To make the particles of the calcium phosphate-based material, the lower press die 4 best shown in FIG. 2 is pulled from an inside position to an outside position, as shown by the phantom line in FIG. 2, together with the tray 14 in a direction forwardly of the compressive pulverizing machine 1, and a plurality of molded bodies 20, each prepared in the manner hereinbefore described, are placed on the lower press die 4 held at the outside position. At this time, those molded bodies 20 have to be placed with the elongated pores 22 (FIG. 8D) oriented in a direction up and down, that is, in a direction conforming to the direction of the needlelike projections 16 fitted to the upper press die 8 shown in FIG. 1.

Subsequently, the lever assembly 10 is operated to move downwardly from the upright position towards the horizontally laid position in a direction shown by the arrow X as shown in FIG. 2 so that the upper press die 8 shown in FIG. 1 may be moved in a direction conforming to the direction of extension of the elongated pores 22 of the molded bodies 20. As the lever assembly 10 is so pivoted towards the horizontally laid position, the plural needlelike projections 16 protruding downwardly from the upper press die 8 are pierced past the throughholes 6a in the clogging preventive plate 6 to pulverize the molded bodies 20 and are then pierced through the throughholes 4a in the lower press die 4. At this time, divided scraps of the molded bodies 20 so pulverized in the manner described above are recovered from the tray 14 immediately beneath the lower press die 4 shown in FIG. 1. Thereafter, the lever assembly 10 is pivoted towards the upright position to allow the upper press die 8 to be lifted. At this time, some of the divided scraps sticking to the needlelike projections 16 are swept off by the clogging preventive plate 6 as they leave from the throughholes 6a in that clogging preventive plate 6.

The calcium phosphate-based particles so pulverized in the manner described above are classified according to the particle size. For this purpose, using a sieve, the calcium phosphate-based particles are screened for 5 minutes or longer. By so doing, without extremely altering the particle size of the calcium phosphate-based particles, the calcium phosphate-based particles can be substantially rounded.

Although the process comprised of the above described steps has been shown and described as carried out manually, some or all of the process steps described above may be performed automatically.

If the thickness of the molded body 20 is changed, the particles of a desired particle size can be molded. In general, the greater the thickness of the molded body 20, the larger the particle size of the resultant particles. In other words, the particle size is proportional to the thickness of the molded body 20. It is to be noted that the particle size of the calcium phosphate-based particles is preferably within the range of 0.5 to 5.0 mm in terms of easiness to handle and filling capability. By way of example, when the molded body 20 of 1.5 to 3.0 mm in thickness as measured in a direction parallel to the elongated pores 22 is compressively pulverized by the needlelike projections 16 of 1.2 mm in diameter, the number of those projections 16 being in a density of 16 projections per $cm^2$, the calcium phosphate-based material having a particle size within the range of 1.0 to 5.0 can be obtained.

The particles of the calcium phosphate-based material manufactured in the manner as hereinbefore described are utilized in various fields of application including an adsorbent for adsorbing carbon dioxide gas, a filtering material, a catalyst carrier, a heat insulating material, an acoustic material, adsorbent or absorbent, a bone filling material, a bioreactor carrier and so on. If it is used in the carbon dioxide gas adsorbent or the bone filling material, the use thereof in those applications is particularly desirable since it can be easily handled because of uniformity in particle size and the filling fraction can be increased.

A method of using the pulverized particles of the calcium phosphate-based material so manufactured as hereinbefore described as the bone filling material includes, depending on the necessity, immersing them in a physiological saline, followed by filling them, or a mixture of them with an autologous bone, in a bone fractured portion.

According to the above described method of making the calcium phosphate-based particles, since the molded body 20 containing the calcium phosphate-based material as a principal component is pulverized by the plural needlelike projections 16, as compared with the conventional pulverization by the use of a roll mill, the pulverized matter (calcium phosphate-based particles) within a particular range of particle sizes can be obtained at a high yield. In other words, since the needlelike projections 16 arranged in an equidistantly spaced pattern apply a load uniformly to a multiple of point on the molded body 20, equidistant fracture occurs in the molded body 20 and, as a result, the uniform particles can be obtained at a high yield. Accordingly, reduction in yield during the manufacture of the particles is alleviated and the yield is markedly increased.

Since the molded body 20 is of a structure having defined therein the plural elongated pores 22 that are oriented in one direction and is compressively pulverized with the needlelike projections 16 driven in a direction parallel to such one direction, even in the molded body 20 having the pores 22 the desired particles can be easily obtained when the size and arrangement of the needlelike projections 16 are altered.

EXAMPLES

Hereinafter, the present invention will be demonstrated by way of the following examples, which are not intended to limit the scope of the present invention, but are to be construed as presented for the purpose of mere illustration of the present invention.

Manufacturing Example 1

This manufacturing example 1 pertains to preparation of the molded body containing the calcium phosphate-based material as a principal component.

20% by weight of hydroxylapatite and 4.8% by weight of gelatin were dispersed and dissolved in 75.2% by weight of distilled water to provide a slurry 26. The resultant slurry 26 was subsequently filled in a quantity of 10 grams, into a container 28 of a centrifugal tube (made of a polypropylene resin) of about 16 mm in inner diameter and 15 ml in capacity, which is manufactured by and available from Greiner Bio-One (Germany) corporation, and was then left for three hours in a refrigerator retained at 4° C. to cool it. Thereafter, the container 28 was immersed in an ethyl alcohol bath, cooled down to −20° C., at a rate of 24 mm/h to allow frost column-like crystal shaped ices to develop within the slurry 26. After a frozen body of the slurry 26 obtained in the manner described above had been sublimated in vacuum, the resultant dried body was sintered for one hour at 1,200° C. to complete the molded body 20 containing the calcium phosphate-based material as a principal component and having oriented pores.

Manufacturing Example 2

This manufacturing example 2 pertains to the preparation of the calcium phosphate-based particles of 2 to 5 mm in particle size.

The molded body prepared in Manufacturing Example 1 above was cut to a columnar shape of 3.0 mm in thickness, which was in turn pulverized by the pulverizing machine 1 of a type having the 16 needlelike projections per $cm^2$ with the grid angle of 60°, having each needlelike projection being 1.2 mm in diameter, and also having the neighboring needlelike projections spaced 3.0 mm. It is to be noted that the resultant pulverized specimen was sieved with the use of a sieve, comprised of a combination of a screen of 4.75 mm in nominal mesh and a screen of 2.36 mm in nominal mesh, to provide the specimen of 2 to 5 mm in particle size (Example 1). With the specimens having been weighed, the yield was calculated. The particle size of 2 to 5 mm referred to above is the one exhibited by the specimen which has passed through the screen of 4.75 in nominal mesh, but not through the screen of 2.36 mm in nominal mesh, and the nominal mesh referred to above represents the sieve opening for a test sieve as stipulated according to JIS (Japan Industrial Standard) Z8801-1. The yield referred to above is represented by the weight of the particles after having been sieved, which is divided by the weight of the molded body 20 before the latter is pulverized.

On the other hand, the molded body prepared in Manufacturing Example 1 above was cut to a columnar shape of 3.0 mm in thickness, which was in turn introduced into a mill crusher, driven at 12,900 rpm, to pulverize it five times each for 1 second (i.e., by repeating five times, a cycle of 1 second pulverization and 10 second pause). The resultant pulverized specimen was sieved with the use of a sieve, comprised of a combination of a screen of 4.75 mm in nominal mesh and a screen of 2.36 mm in nominal mesh, to provide the specimen of 2 to 5 mm in particle size (Comparison 1). With the specimens having been weighed, the yield was calculated.

Also, the molded body prepared in Manufacturing Example 1 above was cut to a columnar shape of 3.0 mm in thickness, which was in turn introduced into an agate mortar and was pulverized with an agate rod (92.6 g and φ20×130 mm) that was stroked three times per second for 60 seconds. The resultant pulverized specimen was sieved with the use of a sieve, comprised of a combination of a screen of 4.75 mm in nominal mesh and a screen of 2.36 mm in nominal mesh, to provide the specimen of 2 to 5 mm in particle size (Comparison 2). With the specimens having been weighed, the yield was calculated.

Also, the molded body prepared in Manufacturing Example 1 above was cut to a columnar shape of 3.0 mm in thickness, which was in turn introduced into a stainless steel plate and was pulverized by dropping a wooden hammer (293.0 g, φ45 mm×130 mm in head, 10×20×280 mm in shaft) 50 free falls onto the plate at an angle of 60° and at an initial speed of 0 m/s. The resultant pulverized specimen was sieved with the use of a sieve, comprised of a combination of a screen of 4.75 mm in nominal mesh and a screen of 2.36 mm in nominal mesh, to provide the specimen of 2 to 5 mm in particle size (Comparison 3). With the specimens having been weighed, the yield was calculated.

Yet, the molded body prepared in Manufacturing Example 1 above was cut to a columnar shape of 3.0 mm in thickness, which was in turn introduced into a roll crusher made of alumina and having a roll clearance of 3 mm, driven at 20 rpm, to provide the pulverized specimen. The resultant pulverized specimen was sieved with the use of a sieve, comprised of a combination of a screen of 4.75 mm in nominal mesh and a screen of 2.36 mm in nominal mesh, to provide the specimen of 2 to 5 mm in particle size (Comparison 4). With the specimens having been weighed, the yield was calculated.

Furthermore, the molded body prepared in Manufacturing Example 1 above was cut to a columnar shape of 3.0 mm in thickness, which was in turn introduced into a jaw crusher made of a high-chromium cast iron and having a clearance of pulverizing teeth being 1 to 8 mm, driven with driving teeth stroked at 325 times per minute for 3 seconds, to provide the pulverized specimen. The resultant pulverized specimen was sieved with the use of a sieve, comprised of a combination of a screen of 4.75 mm in nominal mesh and a screen of 2.36 mm in nominal mesh, to provide the specimen of 2 to 5 mm in particle size (Comparison 5). With the specimens having been weighed, the yield was calculated.

The respective yields in Example 1 and Comparisons 1 to 5 are shown in the following Table 1.

TABLE 1

| | Ex. 1 | Comp. 1 | Comp. 2 | Comp. 3 | Comp. 4 | Comp. 5 |
| --- | --- | --- | --- | --- | --- | --- |
| | | | Pulverizing Device | | | |
| | Inventive Machine | Mill Crusher | Mortar | Hammering | Roll Crusher | Jaw Crusher |
| Yield (%) | 71.9 | 6.4 | 29.9 | 28.2 | 5.3 | 7.1 |

As can readily be understood from Table 1 above, Example 1 has shown a markedly high yield as compared with that in any one of Comparisons 1 to 5.

Examples 2 to 6 were obtained by pulverization having been done with the use of the pulverizing machines 1 employing the needlelike projections 16 having different sizes and different arrangements from Example 1 as shown in the following Table 2, and the respective yields obtained are shown in Table 2 below.

TABLE 2

| | Ex. 1 | Ex. 2 | Ex. 3 | Ex. 4 | Ex. 5 | Ex. 6 |
| --- | --- | --- | --- | --- | --- | --- |
| Grid Angle (°) | 60 | 60 | 60 | 60 | 60 | 90 |
| Projection Diameter (mm) | 1.2 | 1.2 | 1.2 | 1.2 | 1.7 | 1.2 |
| Projection Spacing (mm) | 3.0 | 2.0 | 4.0 | 5.0 | 3.0 | 3.0 |
| Number of Projections per $cm^2$ | 16 | 33 | 12 | 8 | 16 | 16 |
| Thickness of Mold Body (mm) | 3.0 | 3.0 | 3.0 | 3.0 | 3.0 | 3.0 |
| Yield (%) | 71.9 | 59.8 | 72.6 | 40.9 | 71.7 | 66.0 |

Examples 2 to 4 are similar to Example 1, but differ therefrom in that the spacing of the needlelike projections, that is, the number of the needlelike projections per unitary surface area has been changed. Example 3 has shown the highest yield, but even Examples 2 and 4 have shown the respective yields which have been considerably improved as compared with those in Comparisons 1 to 5. Accordingly, the number of the needlelike projections per unitary surface area preferably has to be chosen within the range of 5 to 35 per $cm^2$.

Example 5 is similar to Example 1, but differs therefrom in that the diameter of each of the needlelike projections has been changed. The yield exhibited in Example 5 changes little from that exhibited in Example 1. Accordingly, the diameter of each of the needlelike projections preferably has to be chosen within the range of 1.0 to 2.0 mm. Example 6 is similar to Example 1, but differs therefrom in that the grid angle of the needlelike projections has been changed. The yield exhibited in Example 6 makes little change from that exhibited in Example 1. Accordingly, the grid angle of the needlelike projections preferably has to be chosen within the range of 60 to 90°.

Manufacturing Example 3

This manufacturing example 3 pertains to preparation of the calcium phosphate-based particles of 1 to 2 mm in particle size.

The pulverization was carried out in a manner similar to that in Manufacturing Example 2 except that the molded body obtained in Manufacturing Example 1 was cut to a columnar shape of 1.5 mm in thickness. The resultant pulverized specimen was then sieved with the use of a sieve, comprised of a combination of a screen of 1.70 mm in nominal mesh and a screen of 1.18 mm in nominal mesh, to provide the specimen of 1 to 2 mm in particle size (Example 7). With the specimens having been weighed, the yield was calculated. On the other hand, in place of the pulverizing machine of the type referred to above being used, pulverization was carried out in respective manners similar to Comparisons 1 to 5 and the resultant pulverized specimens were then sieved with the use of a sieve, comprised of a combination of a screen of 1.70 mm in nominal mesh and a screen of 1.18 mm in nominal mesh, to provide the specimens of 1 to 2 mm in particle size (Comparisons 6 to 10). It is to be noted that the roll clearance in the roll crusher employed in Comparison 9 was chosen to be 1.5 mm to suit to the thickness of the molded body. Respective yields exhibited in Example 7 and Comparisons 6 to 10 are shown in the following Table 3.

TABLE 3

| | Ex. 7 | Comp. 6 | Comp. 7 | Comp. 8 | Comp. 9 | Comp. 10 |
|---|---|---|---|---|---|---|
| | | | Pulverizing Device | | | |
| | Inventive Machine | Mill Crusher | Mortar | Hammering | Roll Crusher | Jaw Crusher |
| Yield (%) | 51.2 | 6.0 | 13.5 | 4.8 | 6.3 | 2.6 |

As can readily be understood from Table 3 above, Example 7 has shown a markedly high yield as compared with that in any one of Comparisons 6 to 10.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment shown in FIG. 1, the upper press die 8 has been shown and described as provided with the downwardly oriented needlelike projections 16 and as movable downwardly to compressively pulverize the molded body 20, the lower press die 4 may be provided with upwardly oriented needlelike projections 16 so that the molded body 20 can be compressively pulverized when the needlelike projections 16 are moved upwardly.

Accordingly, such changes and modifications are, unless they depart from the scope of the present invention as delivered from the claims annexed hereto, to be construed as included therein.

REFERENCE NUMERALS

1 . . . Compressive pulverizing machine
4 . . . Lower press die
6 . . . Clogging preventive plate
8 . . . Upper press die
10 . . . Lever assembly (Drive unit)
16 . . . Needlelike projection
20 . . . Molded body
22 . . . Pore (Void hole)

What is claimed is:

1. A method of making calcium phosphate particles, the method comprising:
   compressively pulverizing a molded body comprising, as a principal component, a calcium phosphate material with a plurality of needle projections which protrude in a parallel fashion to each other,
   wherein the molded body comprises a plurality of void holes oriented in a first direction;
   the pulverizing comprises moving the needle projections in a second direction, in which the needle projections protrude; and
   the second direction is aligned with the first direction.

2. The method of claim 1, wherein a diameter of each of the needle projections is within a range of 1.0 to 2.0 mm.

3. The method of claim 2, wherein a number of the needle projection per unitary surface area is within a range of 5 to 35 per cm$^2$.

4. The method of claim 2, wherein the molded body has a thickness within a range of 1.5 to 3.0 mm, as measured in a direction parallel to the first direction, and the particles have a particle size within a range of 1.0 to 5.0 mm.

5. The method of claim 1, wherein a number of the needle projection per unitary surface area is within a range of 5 to 35 per cm$^2$.

6. The method of claim 5, wherein the molded body has a thickness within a range of 1.5 to 3.0 mm, as measured in a direction parallel to the first direction, and the particles have a particle size within a range of 1.0 to 5.0 mm.

7. The method of claim 1, wherein a grid angle of the needle projections is within a range of 60 to 120°.

8. The method of claim 7, wherein the molded body has a thickness within a range of 1.5 to 3.0 mm, as measured in a direction parallel to the first direction, and the particles have a particle size within a range of 1.0 to 5.0 mm.

9. The method of claim 1, wherein the molded body has a thickness within a range of 1.5 to 3.0 mm, as measured in a direction parallel to the first direction, and the particles have a particle size within a range of 1.0 to 5.0 mm.

10. The method of claim 1, wherein a grid angle of the needle projections is within a range of 60 to 90°.

11. The method of claim 1, wherein a grid angle of the needle projections is 60°.

12. The method of claim 1, wherein a grid angle of the needle projections is 90°.

* * * * *